Figure 1:
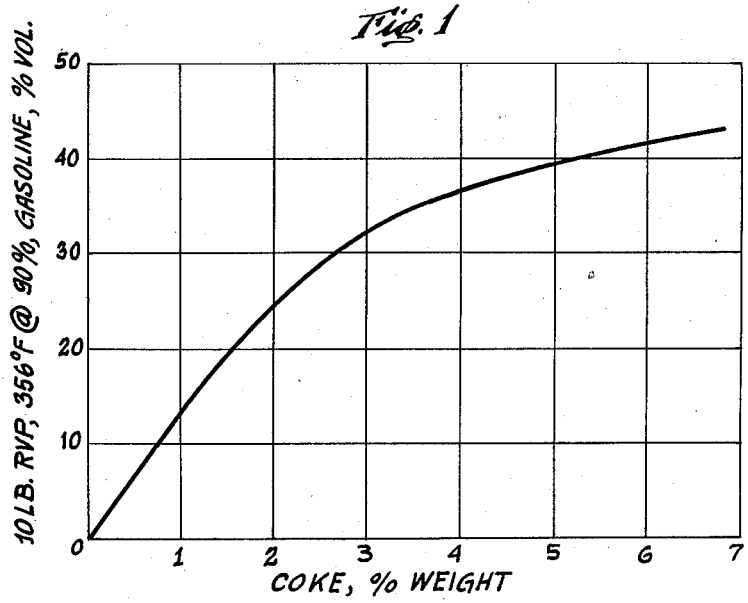

May 3, 1960

A. B. SCHWARTZ 2,935,483

SILICA-ALUMINA-MAGNESIA CATALYST

Filed Jan. 5, 1956

INVENTOR
Albert B. Schwartz
BY
Raymond W. Barclay
ATTORNEY

United States Patent Office 2,935,483
Patented May 3, 1960

2,935,483

SILICA-ALUMINA-MAGNESIA CATALYST

Albert B. Schwartz, Philadelphia, Pa., assignor to Socony Mobil Oil Company, Inc., a corporation of New York Application January 5, 1956, Serial No. 557,484

3 Claims. (Cl. 252—455)

This invention relates to a cogelled silica-alumina-magnesia catalyst useful in hydrocarbon conversion and to a method for preparing the same. More particularly, the present invention is concerned with a hydrocarbon conversion catalyst consisting essentially of a major proportion of silica and minor proportions of alumina and magnesia combined in the form of a cogel in particular proportion which has been found to afford an attractive yield of gasoline of high octane rating when employed in the cracking of mineral oils.

It has heretofore been known that synthetic porous solids comprising silica and one or more metal oxides have catalytic properties for the treatment of mineral oils. In the cracking of these mineral oils, the catalytic properties will depend on the metal oxide or oxides incorporated with the silica, the method of and treatment during incorporation, and the quantity or quantities incorporated. Thus, one general classification of synthetic contact masses comprises silica and alumina with or without the addition of a third component, such as zirconia, or the like. These catalysts are characterized as those producing relatively large amounts of olefinic and isoparaffinic hydrocarbons and capable of producing naphthas in the gasoline boiling range which contain appreciable quantities of mono and polycyclic hydrocarbons. Since the gasoline product so obtained is characterized by a high octane rating, these catalysts are especially desirable for the manufacture of aviation gasolines. Another general classification of synthetic contact masses comprises silica and magnesia as the major oxides with or without the addition of minor amounts of other metal oxides. In comparison with the silica-alumina type catalysts, the silica-magnesia catalysts during cracking produce smaller quantities of the lower molecular weight olefinic and isoparaffinic hydrocarbons and a substantial increase in hydrocarbons boiling in the range of 100° F. to 450° F. The silica-alumina catalysts are usually more thermally stable and produce a gasoline having a higher octane number than that normally obtained from the silica-magnesia type catalyst. On the other hand, the silica-magnesia catalysts for a given conversion into gasoline normally produce less degradation of the feed stock into low grade products, such as gas and coke, with a resultant higher yield of gasoline. This latter characteristic, known as "a favorable product distribution," increases the realization of useful products and also makes it possible to operate catalytic conversion processes with these catalysts with a greater proportion of the time in processing and a lesser proportion of time in catalyst regeneration.

It is evident that it would be highly desirable to provide a catalyst which would have the high octane advantage of the silica-alumina type catalyst and the high yield advantage of the silica-magnesia type catalysts without being subject to the aforementioned disadvantages of each. It is a major object of the present invention to provide just such a catalyst, i.e., a catalyst capable of affording the high gasoline yields obtained with the silica-magnesia catalysts without substantial decrease in the octane rating obtained with the silica-alumina catalysts. A further object is the provision of a method for preparing said catalyst wherein the relative amounts of alumina and magnesia are controlled. A still further object is to provide a hard attrition-resistant catalyst of the above characteristics. These and other objects which will be apparent to those skilled in the art have been achieved in accordance with the present invention by the provision of a silica-alumina-magnesia cogelled catalyst of particular composition and method for producing the same.

Composites of silica, alumina, and magnesia have heretofore been known and employed in the catalytic treatment of petroleum hydrocarbons. In this class of catalysts, the alumina is present in minor proportion and usually in quantities of the order of 1 to 5 percent. The magnesia content is usually within the range of about 20 to 40 percent and the balance is substantially all silica. Such composites have been utilized primarily for improvement in stability toward catalyst deactivation. The octane number of the gasoline product obtained with these catalysts has been much less than that of gasoline obtained upon corresponding treatment with silica-alumina catalysts and has, in fact, constituted no appreciable improvement over that obtained with the silica-magnesia catalysts. These composites of silica, alumina, and magnesia have been prepared in various ways. One method has involved treating a silica-magnesia gel with a solution of an aluminum salt for such period of time and under such conditions that at least a portion of the magnesia is replaced by alumina. This method has the disadvantage of requiring a two-step process in order to achieve the desired composite, namely, initial formation of a silica-magnesia gel and subsequent treatment of such gel with an aluminum salt solution. Moreover, the composition of the resultant composite is difficult to control by this method since repetition of the procedural steps generally leads to composites of varying composition.

Another method which has been employed for preparing composites of silica, alumina, and magnesia has involved producing a silica gel by acidification of an alkali metal silicate solution, impregnating the gel so formed with a solution of a soluble aluminum salt and drying to yield a silica gel impregnated with alumina. The resultant gel is thereafter mulled with magnesium oxide, which involves grinding the gel with magnesium oxide in a manner similar to the grinding of material in a mortar with a pestle. The mulling operation is generally tedious and undesirable. Washing of the catalyst and separation of impurities where such an operation is used present an additional problem. In the prior art procedures heretofore in use, it has been practically impossible to obtain a washed silica-alumina-magnesia containing a given metal oxide content. Thus, in two identical preparations, the metal oxide content in the final catalyst may vary considerably. Still another method which has been used in formulating composites of silica, alumina, and magnesia has entailed mechanical admixture of separately prepared silica-alumina composites and silica-magnesia composites. Such method has the disadvantage of involving the steps of separately preparing a silica-alumina gel and silica-magnesia gel, followed by mixing of the gels in proper proportion. This process is further disadvantageous in requiring gel-making facilities for two different types of gels. Various other procedures for preparing silica, alumina, and magnesia composites have involved the addition of magnesia as a slurry in water to a silica hydrosol which has been previously mixed with an aluminum salt and also the impregnation of a silica hydrogel with a mixture of aluminum and magnesium salts.

The catalysts of silica, alumina, and magnesia prepared by the foregoing methods have not served to bring about any substantial increase in octane rating of the resultant gasoline product over that obtained with silica-magnesia catalysts. Moreover, the aforementioned composites of silica, alumina, and magnesia, due to their method of preparation, often give rise to catalysts of poor mechanical strength. It is well recognized that modern catalytic processes require catalysts which are not only specifically active in the chemical reactions which are to be catalyzed but also possess physical characteristics required for successful commercial operation. One of the outstanding physical attributes of a commercial hydrocarbon conversion catalyst is hardness, that is, resistance to attrition. The ability of a particle to hold its shape in withstanding the mechanical handling to which it is subjected in storage, shipment, and use is a primary requirement for a successful catalyst for modern cracking processes.

In accordance with the present invention, a cogelled silica-alumina-magnesia catalyst of particular composition has been found to possess the property of affording high gasoline yields of enhanced octane rating when employed in the cracking of petroleum hydrocarbons. The catalyst so obtained, due to its method of preparation, has further been found to be characterized by a hardness requisite for use in present day cracking operations. Broadly stated, the composition of the invention is a silica-alumina-magnesia cogel in which the ratio of magnesia to total metal oxides content and said metal oxide content of the cogel are critical features in imparting the desired characteristics of high yield-high octane rating to the catalyst. In particular, it has been found that the alumina content should not be less than the magnesia content of the catalyst, that the total metal oxide content of the catalyst, i.e., total alumina and magnesia, should be between 15 and 40 percent by weight and, further, that the percent weight magnesia multiplied by 100 and divided by the total percent weight of magnesia and alumina should be between 20 and 50, the remainder of the catalyst being substantially all silica. Expressed equation-wise the above conditions are fulfilled when:

(1) Percent $Al_2O_3$ is equal to or greater than percent $MgO$ (2) Percent $Al_2O_3$ + percent $MgO$ = 15 to 40

(3) $\dfrac{\text{Percent } MgO}{\text{Percent } Al_2O_3 + \text{percent } MgO} \times 100 = 20 \text{ to } 50$ The catalyst described herein is further characterized as being a cogel, by which is meant a gel of silica, alumina, and magnesia obtained upon drying a true all-embracing hydrogel containing silica, alumina, and magnesia, such hydrogel, in turn, having been obtained by the preparation and gelation of hydrosol containing silica, alumina, and magnesia. The intermediate hydrogel state obtained in preparation of the present catalyst is to be distinguished from a gelatinous precipitate. True all-embracing hydrogels occupy the entire volume of the solution from which they are formed and possess a definitely rigid structure. When fractured, a true hydrogel shows a conchoidal fracture as compared to an irregular ragged edge fracture observed in the case of gelatinous precipitates. The latter, moreover, occupy only a part of the volume of the solution from which they are formed and have no rigidity of structure. In addition, hydrogels can generally be more easily washed free of soluble impurities due to the tendency of gelatinous precipitates to peptize on washing. A distinct and further advantage of hydrogels is that, due to the rigid structure, they can be formed into high quality spheroidal particles.

The method of this invention is particularly applicable to the preparation of silica-alumina-magnesia cogels of above defined composition in the form of particles of definite and preferably uniform size and shape. Thus, the invention is especially useful as applied to the manufacture of spherically shaped catalyst particles. Larger size spheres are ordinarily within the range of from about 1/64" to about 1/4" in diameter, whereas smaller size spheres which are generally referred to as "microspheres" are within the range of from about 10 to about 100 microns in diameter. The use of spherically shaped catalysts is extremely advantageous in hydrocarbon conversion processes. As applied to moving catalyst type processes, including the moving bed catalyst process, the fluidized process, etc., the spheres do not contain sharp edges which tend to break off and thereby cause fines which are lost in the exhaust gases. Moreover, spheroidal particles do not cause equipment erosion due to the large extent caused by particles containing sharp edges. As applied to the stationary bed processes, spheroidal particles effect better contact between the reactants and the catalyst by avoiding channeling.

It is accordingly a preferred embodiment of the present invention to prepare the described cogelled silica-alumina-magnesia catalyst in the form of spheres, although it is to be realized that the method hereinafter set forth may also be employed in obtaining a mass of gel which may thereafter be broken up into particles of desired size. Likewise, the method described herein may be used for the preparation of instant silica-alumina-magnesia cogelled catalysts in the form of particles of any other desired size or shape. The process of the invention comprises a method for preparing a silica-alumina-magnesia cogelled catalyst by simultaneously mixing three separate reagent streams, namely:

(1) An acidic stream containing an aluminum compound capable of affording at least a portion of the ultimate alumina content of the catalyst.

(2) An alkali metal-silicate stream, and (3) A stream of an aqueous suspension of magnesia or magnesium compound which will give magnesia on decomposition.

The three streams are combined to yield an alkaline hydrosol, the maximum acid being such as to substantially neutralize the alkali metal silicate but insufficient to form the magnesium salt of the acid employed. In general, the hydrosol and the hydrogel obtained upon gelation have a pH in the range of 8 to 11. The resulting hydrogel is thereafter subjected to a hydrothermal treatment. It has been found in accordance with this invention that the severity of the hydrothermal treatment serves to control the relative amounts of alumina and magnesia. Thus, it has been found that increasing the severity of the hydrothermal treatment reduces the amount of magnesia in the hydrogel which is replaceable by aluminum or other ions in subsequent base exchange. After hydrothermal treatment, the resulting hydrogel is base exchanged, water-washed, dried, and calcined.

One embodiment of the invention comprises simultaneous mixing of three separate reagent streams of mineral acid and aluminum sulfate, alkali metal silicate, and aqueous slurry of magnesia under conditions of pH control such that the resulting hydrogel has a pH in the range of 8 to 11 and an ultimate silica, alumina, and magnesia content on a dry basis, after hydrothermal treatment and base exchange of the hydrogel, defined by the critical limits set forth hereinabove. Another embodiment of the invention involves the simultaneous contacting under the above controlled conditions of pH of three streams wherein the magnesia stream is further characterized by the suspension therein of finely pulverized dried gel of silica, alumina, magnesia or combinations of these oxides. The resulting catalysts exhibit unusual hardness characteristics and improved regeneration characteristics over the catalysts in which such pulverized gel is absent.

The process of this invention may be carried out on a batch, semi-batch, or continuous basis. Thus, the hydrosol formed upon contacting the three reagent streams as aforesaid may be conducted into setting tubs and allowed to remain therein for a sufficient time to effect gelation, after which the resulting hydrogel is removed, broken up into pieces of desired size, hydrothermally treated, base-exchanged, and washed to remove soluble material therefrom. The washed hydrogel is thereafter dried and activated for use as a catalyst. The instant process, as indicated above, has been found to be particularly useful for the production of silica-alumina-magnesia catalysts in the form of spheroidal particles. The hydrosol produced in accordance with this invention may be formed into spheroidal particles by any feasible process, such as the methods described in patents to Marisic, for example, U.S. 2,384,946. Broadly, such methods involve flowing the hydrosol over a dividing cone to separate the same into a plurality of streams and admitting each of said streams into a column of water-immiscible liquid, for example, an oil medium wherein the globules of hydrosol set to a hydrogel and subsequently pass into an underlying layer of water from which they are sluiced to further processing operations such as hydrothermal treatment, base-exchange, water-washing, drying, and calcining.

It is important to maintain the pH of the prepared silica-alumina-magnesia hydrosol and hydrogel on the alkaline side and preferably in the range of 8 to 11 since, with the formation of an acidic hydrosol, a portion of the magnesia or equivalent magnesium compound would be converted to the magnesium salt of the acid employed, which, being water-soluble, would be subsequently removed and lost during washing of the formed hydrogel. Such method of operation would not only be wasteful of the magnesium reagent but would also necessitate the use of excess quantities of magnesium reagent over and above that contained in the resultant washed composite in order that the final catalyst may have the critical magnesia content defined hereinabove. By following the method of the present invention, it has been found, upon simultaneously combining three separate reagent streams to form a silica-alumina-magnesia hydrosol and controlling the pH of the resulting hydrosol in the range of 8 to 11, that an improved and efficient process is achieved with no appreciable loss of magnesium reagent when the resulting cogel is washed.

The magnesium compound used in the present process may comprise magnesia or any decomposable compound of magnesia which will give magnesia on decomposition. Suitable decomposable magnesium compounds are, for example, magnesium hydroxide, magnesium carbonate, and basic magnesium carbonate. Under certain conditions, particularly where unusual hardness characteristics and high catalyst regeneration characteristics are desired, it has been found to be desirable to include a minor proportion, generally between about 10 and about 30 percent by weight of the final catalyst of finely pulverized silica-magnesia or silica-alumina gel having a particle size of less than 50 microns and preferably less than 20 microns. The cogel catalysts so prepared are extremely resistant to attrition. The acid employed may be any of the acids heretofore used in inorganic oxide hydrogel preparation including acids salts, such as ammonium sulfate and ammonium chloride. In general, however, it is preferred to use inorganic mineral acids and, in particular, sulfuric acid. The aluminum compound employed is preferably aluminum sulfate, although it is contemplated that other water-soluble aluminum compounds may also be used. The alkali metal silicate employed is preferably sodium silicate although it is contemplated that other silicates of the alkali metals may likewise be employed.

The three reagent streams of acid-aluminum compound, alkali metal silicate, and magnesia or equivalent compound are simultaneously contacted in accordance with the present process in a mixing nozzle under conditions of rapid flow, affording intimate admixture thereof with resultant formation of a hydrosol. The three streams are combined to yield an alkaline hydrosol and the resultant hydrogel obtained upon setting of said sol is characterized by a pH in the range of 8 to 11.

The hydrogel so obtained is subjected to a hydrothermal treatment to improve the reaction between the respective components and to render the hydrogel in condition for the desired extent of base-exchange. It has been found that increasing the severity of the hydrothermal treatment reduces the amount of magnesia in the hydrogel which is replaceable in the subsequent base-exchange operation. The hydrothermal treatment involves contacting the hydrogel with aqueous liquid for an extended period of time. The temperature at which hydrothermal treatment is carried out is between about 70° F. and about 212° F. and the duration of such treatment is within the approximate range of 1 to 48 hours. The time and temperature of hydrothermal treatment are correlated in accordance with the process of the present invention so that the amount of original magnesia capable of replacement during the subsequent base-exchange step is governed by the expression $M = 115 - 18 \log_{10} t - 0.21T$, where $M$ is the percent of original magnesia in the hydrogel which is replaceable, $t$ is the time of the hydrothermal treatment in hours, and $T$ is the temperature of such treatment in degrees Fahrenheit.

The hydrogel may be base-exchanged with a suitable aqueous solution. The base-exchange solution used may be one capable of replacing zeolitic alkali metal without the introduction of additional metal into the hydrogel, such as a solution of an ammonium salt or an acid. If desired, the hydrogel may be base-exchanged with an aqueous magnesium salt solution or an aqueous aluminum salt solution, although by using a base-exchange solution of a metal salt other than one of magnesium or aluminum, it is possible to introduce small quantities of a third metal into the hydrogel composite and to thus afford a resulting catalyst containing silica, alumina, magnesia, and the oxide of a third metal, the salt of which was employed in the base-exchange solution. For example, the hydrogen containing zeolitic alkali metal may be base-exchanged with a manganese salt solution, such as aqueous manganese nitrate, and the resulting base-exchanged composite would be a silica-alumina-magnesia-manganese oxide catalyst. In such manner, it is possible to prepare silica-alumina-magnesia combinations containing minute mounts of one or more oxides of other metals, such as chromium, titanium, zirconium, zinc, beryllium, thorium, copper, iron, and cadmium. The incorporation of such additional metal oxide into the catalyst may serve as a promoter under particular reaction conditions. It is, however, to be understood that the catalyst of the instant invention is primarily a cogel consisting essentially of a major proportion of silica and minor proportions of alumina and magnesia in which the content of alumina is not less than the content of magnesia and the content of these two metal oxides are defined by the expressions:

$$\text{Percent Al}_2\text{O}_3 + \text{percent MgO} = 15 \text{ to } 40$$

$$\frac{\text{Percent MgO}}{\text{Percent Al}_2\text{O}_3 + \text{percent MgO}} \times 100 = 20 \text{ to } 50$$

Upon base exchange of the silica-alumina-magnesia hydrogel with an aqueous aluminum salt solution, it has been found that, in addition to removal of zeolitic alkali metal, a portion of the magnesia is replaced with alumina. It has been established that the severity of the hydrothermal treatment, to a large extent, controls the amount of magnesia that may be replaced by alumina; consequently, the conditions of this treatment must be carefully controlled consistent with the ultimate catalyst composition as governed by the relationships set forth above. By decreasing the severity of the treatment, that is, reducing the time and temperature at which the hydrogel is in contact with water or other aqueous liquid, the amount of magnesia which may be replaced by alumina is increased. In the absence of a hydrothermal treatment, a large proportion of the magnesia content of the silica-alumina-magnesia hydrogel may be so replaced by alumina. In such manner, additional alumina, if desired, may be incorporated into the silica-alumina-magnesia hydrogel. It has been found that the percent of the original magnesia which may be replaced with aluminum or other ion is governed by correlation of the time and temperature of treatment, in accordance with the expression: $M = 115 - 18 \log_{10} t - 0.21T$, where $t$ is the time of treatment in hours, such time being within the range of 1 to 48 hours, and T is the temperature in degrees Fahrenheit, such temperature being between about 70° F. and about 212° F. The base-exchange operation should be carried out with a sufficient concentration of base-exchange ion and for a sufficient time to replace the zeolitic alkali metal and exchangeable magnesium uniformly throughout the gel structure. If the base-exchange operation is terminated too soon, the gel will not be uniform in structure and may be subject to breakage on drying. Such breakage, as will be apparent, is particularly to be avoided in the case where uniformly shaped gel particles are desired.

After water-washing the resulting hydrogel free of soluble material, the catalyst is dried generally at a temperature in the range of about 150° F. to 400° F. and, when desired, the catalyst may be calcined at a temperature of from about 1150° F. to 1300° F. for a period of about 1 hour or more.

The following examples will serve to illustrate the catalyst and method of the present invention without limiting the same:

EXAMPLE 1

Three separate reagent streams comprising sodium silicate, aluminum sulfate dissolved in an aqueous solution of sulfuric acid, and an aqueous slurry of magnesia and silica-magnesia gel fines were simultaneously mixed in a mixing nozzle. The sodium silicate stream was composed of 105 pounds of sodium silicate having an $Na_2O$ to $SiO_2$ ratio of 1:3.22 and a density of 41° Bé. and 105 pounds of water. The sulfuric acid-aluminum sulfate stream was composed of 10.1 pounds of 96.3% sulfuric acid, 9.63 pounds of aluminum sulfate (containing 45% wt. water), and 105 pounds of water. The magnesia stream containing silica-magnesia fines was composed of 13 pounds of light magnesia slurried in 182 pounds of water and 9.75 pounds of pulverized silica-magnesia gel containing approximately 32 percent weight MgO and 68 percent weight $SiO_2$. The pulverized gel had the following particle size distribution:

95% weight smaller than 40 microns particle diameter
54% weight smaller than 20 microns particle diameter
26% weight smaller than 10 microns particle diameter The three streams were mixed under the following conditions:

| | Cc./min. |
|---|---|
| Silicate solution rate | 365 |
| Acid-aluminum sulfate solution rate | 230 |
| Magnesia (contg. $SiO_2$—MgO gel fines) rate | 390 |

The resulting hydrosol was allowed to flow over a dividing cone into an oil medium contained in conventional bead-forming equipment such as described in the aforementioned Marisic patent. The time of gelation of the above-prepared hydrosol was 5.9 seconds at 72° F. The resulting hydrogel had a pH of 9.3. The hydrogel particles so obtained were base-exchanged with aluminum sulfate solution, washed free of soluble salts, dried in superheated steam at 280° F. and calcined for 3 hours at 1300° F. The finished catalyst contained 24.8 percent weight $Al_2O_3$, 7.5 percent weight MgO, and 67.7 percent weight $SiO_2$. The catalyst had a CAT-A activity of 50.1. After steam treating 24 hours at 1200° F., the CAT-A activity was 39.3.

EXAMPLE 2

The catalyst of this example was prepared in the same manner as that of Example 1 except that the hydrogel particles before base-exchange were hydrothermally treated for 6 hours at 160° F. This catalyst contained 18.7 percent weight $Al_2O_3$, 14.5 percent weight MgO and 66.8 percent weight $SiO_2$. The catalyst had a CAT-A activity of 47.4. After steam treating 48 hours at 1200° F., the CAT-A activity was 35.3.

EXAMPLE 3

Three separate reagent streams comprising sodium silicate, sulfuric acid, and an aqueous slurry of magnesia were simultaneously mixed in a mixing nozzle. The sodium silicate stream was composed of 105 pounds of sodium silicate having an $Na_2O$ to $SiO_2$ ratio of 1:3.22 and a density of 41° Bé. and 105 pounds of water. The acid stream was composed of 17.4 pounds of 96.3 percent sulfuric acid and 127 pounds of water. The magnesia stream was composed of 13 pounds of light calcined magnesia and 181 pounds of water.

The three streams were mixed under the following conditions:

| | Cc./min. |
|---|---|
| Silicate solution rate | 400 |
| Acid solution rate | 265 |
| Magnesia slurry rate | 335 |

The resulting hydrosol was introduced to bead-forming equipment and set to bead hydrogel in 4.9 seconds at 80° F. and a pH of 9.3. The bead hydrogel was hydrothermally treated 6 hours at 160° F., base-exchanged with magnesium sulfate solution, washed free of soluble salts, dried with steam and calcined 3 hours at 1300° F. in air. The finished catalyst contained 25 percent weight MgO and 75 percent weight $SiO_2$. The catalyst had a CAT-A activity of 40.8. After steam treating 24 hours at 1200° F., the activity was lowered to 37.5.

The catalysts prepared as outlined above were tested in a 700 cc. static bed cracking unit using a Mid-Continent gas oil stock having a gravity of 29.6 A.P.I. and an initial boiling point of about 478° F. The test conditions and yields obtained are summarized in Table I below, together with evaluation results for a commercial silica-alumina gel bead catalyst containing approximately 10 percent weight $Al_2O_3$ and 90 percent weight $SiO_2$.

*Table I*

| Examples | 1 | 2 | 3 | Silica-Alumina Gel Bead Catalyst |
|---|---|---|---|---|
| Composition: | | | | |
| $Al_2O_3$, Percent Wt | 24.8 | 18.7 | 0.0 | 10.0 |
| MgO, Percent Wt | 7.5 | 14.5 | 25.0 | 0.0 |
| $SiO_2$, Percent Wt | 67.7 | 66.8 | 75.0 | 90.0 |
| Total Metal Oxides, Percent Wt | 32.3 | 33.2 | 25.0 | 10.0 |
| $100 \times MgO/Al_2O_3 + MgO$ | 23 | 44 | 100 | 0 |
| Test Conditions: | | | | |
| Charge Stock | MidContinent Gas Oil | | | |
| Reactor Temp., °F | 900 | 895 | 903 | 900 |
| Pressure, p.s.i.g | 10 | 10 | 10 | 10 |
| Space Velocity, v./Hr./v | 3.0 | 2.5 | 3.0 | 1.3 |
| Catalyst/Oil, v./v | 4.0 | 4.1 | 4.0 | 4.2 |
| Process Steam, Percent Wt. Chg | 5.0 | 5.0 | 5.0 | 5.0 |
| Yields Based on Charge: | | | | |
| Conversion, Percent Vol | 59.9 | 56.9 | 55.4 | 51.6 |
| 10 lb. RVP, 356° F. at 90% Gasoline, Percent Vol | 46.4 | 47.3 | 46.9 | 38.0 |
| Excess $C_4$'s, Percent Vol | 14.7 | 10.8 | 7.6 | 11.8 |
| Dry Gas, Percent Wt | 6.1 | 5.2 | 5.0 | 6.5 |
| Coke, Percent Wt | 4.3 | 4.2 | 5.3 | 4.4 |
| Gasoline Octane Rating: | | | | |
| Research, clear | 92.4 | 91.0 | 87.8 | 93.9 |
| Research, +3 ml. TEL | 98.7 | 97.8 | 96.6 | 99.3 |
| Gasoline Yield Advantage, Percent Vol | 8.6 | 9.9 | 6.5 | 0.0 |

The above data for the silica-alumina gel bead catalyst show a coke level of 4.4 percent. In order to compare the gasoline yield advantage obtained with the instant silica-alumina-magnesia catalysts over silica-alumina gel beads, such comparison is made at the same coke level.

Figure 1 of the drawing attached hereto represents a gasoline vs. coke curve for the silica-alumina gel bead catalyst. With the aid of this curve, the gasoline yield at varying coke levels is readily determined. The difference in gasoline yield between that obtained with the present silica-alumina-magnesia catalysts and that obtained with the silica-alumina catalyst at the same coke level is reported above as the gasoline yield advantage.

The results show the gasoline yield advantages approaching 10 percent by volume may be obtained with the silica-alumina-magnesia cogel catalysts as compared with silica-alumina beads at the same coke level. The octane rating of the gasolines obtained with the cogelled silica-alumina-magnesia catalysts of preferred composition are equivalent to or only slightly lower than obtained with the silica-alumina catalyst and considerably higher than obtained with silica-magnesia catalyst.

Figure 2:
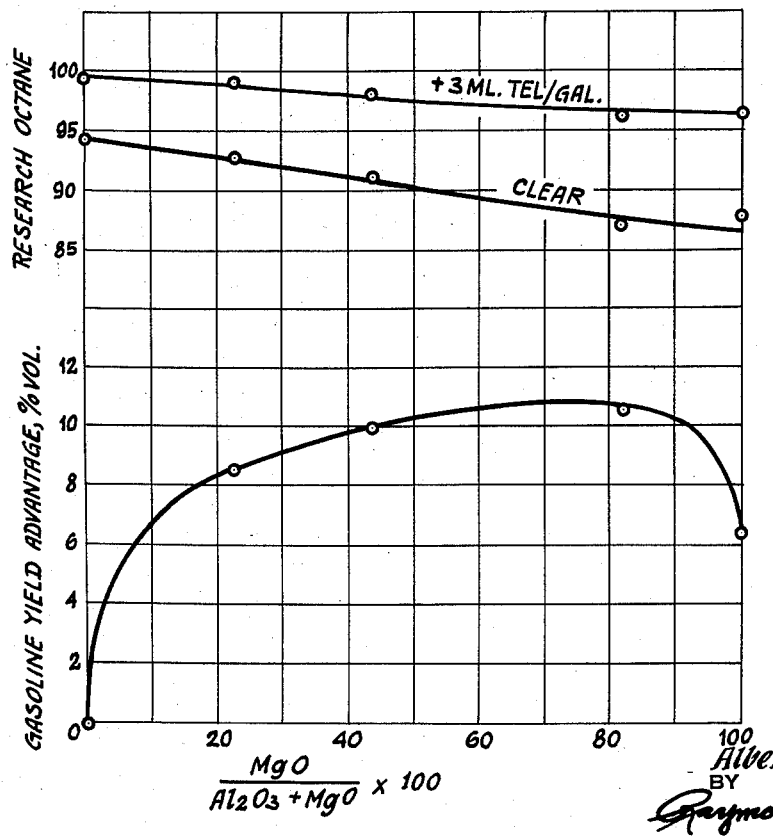

Figure 2 of the drawing shows the additional yields of gasoline (gasoline yield advantage) obtained with the cogelled silica-alumina-magnesia catalysts over the yields obtained with silica-alumina catalyst at the same coke level plotted as a function of catalyst composition. Taking the octane ratings of the gasolines into consideration, the range of composition wherein an appreciable increase in yield of gasoline is obtained without substantial decrease in octane rating as compared with silica-alumina catalyst is represented by the expression:

$$\frac{\text{Percent MgO}}{\text{Percent Al}_2\text{O}_3+\text{percent MgO}} \times 100 = 20 \text{ to } 50$$

the sum of percent $Al_2O_3$ and percent MgO being between 15 and 40 and the remainder of the catalyst being silica. Compositons within the foregoing range are thus essential in achieving the desired objective of a cracking catalyst capable of affording a high yield of gasoline of high octane rating. The catalysts of the invention as noted above are further characterized by a cogel structure.

The magnesia suspension used in preparation of the catalysts may or may not contain pulverized gel fines of silica-magnesia, silica-alumina or silica-alumina-magnesia. In those instances where gel fines are so employed, the resultant catalyst has been found to be generally characterized by improved regeneration characteristics and a high resistance to attrition. Thus, a catalyst prepared in accordance with the following example showed considerably more resistance to attrition than a commercial silica-alumina gel cracking catalyst.

EXAMPLE 4

Three reactant streams consisting of (1) 105 pounds of sodium silicate having an $Na_2O$ to $SiO_2$ ratio of 1 to 3.22 and a density of 41° Bé. and 105 pounds of water, (2) 10.1 pounds of 96.3 percent weight sulfuric acid, 9.63 pounds of aluminum sulfate (containing 45 percent weight water) and 105 pounds of water, and (3) 4.0 pounds of light magnesia, 183 pounds of water, and 8.78 pounds of pulverized silica-magnesia gel containing 26 percent weight MgO and 74 percent weight $SiO_2$ were simultaneously mixed in a mixing nozzle. The pulverized gel employed had the following particle size distribution:

86% weight smaller than 20 microns particle diameter
56% weight smaller than 5 microns particle diameter
34% weight smaller than 2 microns particle diameter The three streams were contacted at the following flow rates:

| | Cc./min. |
|---|---|
| Silicate solution rate | 365 |
| Acid-aluminum sulfate solution rate | 230 |
| Magnesia (containing $SiO_2$—MgO gel fines) rate | 385 |

The resulting hydrosol was formed into bead hydrogel, the gelation time being 5.7 seconds at 86° F. and a pH of 8.9. The bead hydrogel was hydrothermally treated for 6 hours at 160° F., base-exchanged with aluminum sulfate solution, washed free of soluble salts, dried in steam, and calcined 3 hours at 1300° F. The finished catalyst contained 10.0 percent weight $Al_2O_3$, 6.1 percent weight MgO, and 83.9 percent weight $SiO_2$. The catalyst had an initial CAT–A activity of 44.5.

Upon subjecting this catalyst to an attrition test known as the Lauson shaker test, the percent fines was found to be 1.1 while a corresponding test of a commercial silica-alumina gel catalyst (containing approximately 10 percent weight $Al_2O_3$ and 90 percent weight $SiO_2$) showed an appreciably greater attrition of 4.5 percent. The procedure used in the Lauson shaker test consists of shaking a 50 cc. sample of the catalyst to be tested in a closed steel cup which is bolted to the piston of a motor-driven Lauson engine at 1350 r.p.m. After shaking for 10 seconds, the catalyst fines produced passing through an 8-mesh (Tyler) screen are replaced with an equal weight of fresh catalyst make-up. These operations are repeated for 20 cycles, or until the amount of fines produced during successive cycles remains essentially constant. The attrition (fines loss per cycle), expressed as percent weight of original sample, is plotted against the cumulative weight percent replacement. The equilibrium weight percent fines, as read from this plot, is reported as the Lauson shaker test attrition.

Cogelled silica-alumina-magnesia catalysts of the present invention may be prepared without the addition of fines and in the form of particles other than beads as shown by the following examples:

EXAMPLE 5

Three separate streams consisting of sodium silicate, a sulfuric acid solution of aluminum sulfate, and an aqueous slurry of magnesia were simultaneously mixed in a mixing nozzle. The silicate stream was composed of 69.4 pounds of sodium silicate having an $Na_2O$ to $SiO_2$ ratio of 1 to 3.22 and a density of 41° Bé. and 72.1 pounds of water. The acid-aluminum sulfate stream was composed of 8.14 pounds of aluminum sulfate (containing 45 percent water), 4.10 pounds of 96.4 percent sulfuric acid, and 117 pounds of water. The magnesia suspension stream was composed of 5.36 pounds of light magnesia, and 50 pounds of water.

The three streams were contacted at the following flow rates:

| | Cc./min. |
|---|---|
| Silicate solution rate | 400 |
| Acid-aluminum sulfate solution rate | 400 |
| Magnesia suspension rate | 105 |

The resulting hydrosol was formed in hydrogel beads, the gelation time being 3.2 seconds at 68° F. and a pH of 9.7. The bead hydrogel was hydrothermally treated for 6 hours at 160° F., base-exchanged with aluminum sulfate solution, washed free of soluble salts, dried at 280° F. in steam, and calcined for 3 hours at 1300° F. The catalyst contained 14.2 percent weight $Al_2O_3$, 6.2 percent weight MgO, and 79.6 percent weight $SiO_2$, and had an initial CAT–A activity of 42.0.

EXAMPLE 6

This catalyst was prepared in the same manner as Example 5 up to and including the washing stage. The washed bead hydrogel was thereafter frozen at 15° F., thawed, centrifuged to remove excess water, mixed with a small quantity of a light lubricating oil, and then extruded into pellets. These pellets were dried in air at about 100° F. and then calcined 3 hours at 1300° F. The catalyst had the same composition as the catalyst of Example 5 and a CAT–A activity of 47.6.

The catalysts of Examples 4–6 were tested in a 700 cc. static bed cracking unit using the same charge stock as described above. The test conditions and yields obtained are summarized in Table II below:

Table II

| Examples | 4 | 5 | 6 |
|---|---|---|---|
| Composition: | | | |
| Al₂O₃, Percent Wt | 10.0 | 14.2 | 14.2 |
| MgO, Percent Wt | 6.1 | 6.2 | 6.2 |
| SiO₂, Percent Wt | 83.9 | 79.6 | 79.6 |
| Test Conditions: | | | |
| Temperature, °F | 899 | 910 | 908 |
| Space Vel., v./Hr./v | 1.8 | 1.9 | 1.8 |
| Catalyst/Oil, v./v | 4.1 | 4.1 | 4.2 |
| Yields Based on Charge: | | | |
| Conversion, Percent Vol | 51.1 | 56.2 | 55.3 |
| 10 lb. RVP, 356° F. at 90% Gasoline, Percent Vol | 39.9 | 41.0 | 40.2 |
| Excess C₄'s, Percent Vol | 10.9 | 13.7 | 13.7 |
| Dry gas, Percent Wt | 5.8 | 7.0 | 6.9 |
| Coke, Percent Wt | 4.1 | 4.4 | 4.4 |
| Octane Rating of Gasoline: | | | |
| Research, clear | 93.4 | 94.6 | 94.6 |
| Research, + 3 ml. TEL | 99.4 | 100.0 | 99.8 |

The effect of time and temperature of the hydrothermal treatment on the amount of original magnesia capable of replacement during the base-exchange operation will be seen from the foregoing data, i.e., increasing the temperature or duration of such treatment, serves to reduce the amount of magnesia in the hydrogel which is replaced in the subsequent base-exchange step. The procedure of this invention accordingly provides a convenient means for controlling the ultimate magnesia content of the catalyst and by utilizing a base-exchange media of aluminum ions, the method described herein affords a convenient procedure for controlling the relative amounts of alumina and magnesia in the final catalyst so that the relationships characterizing the catalyst of this invention as set forth hereinabove are realized.

It is to be understood that the above description is merely illustrative of preferred embodiments of the invention, of which many variations may be made within the scope of the following claims by those skilled in the art without departing from the spirit thereof.

This application is a continuation-in-part of my co-pending application Serial Number 311,225, filed September 24, 1952, now abandoned.

I claim:

1. A cogelled catalyst consisting essentially of a major proportion of silica and minor proportions of alumina and magnesia in which the alumina content is about 18.7 to about 24.8 percent by weight, the magnesia content is about 7.5 to about 14.5 percent by weight, and remainder silica.

2. A cogelled catalyst consisting essentially of a major proportion of silica and minor proportions of alumina and magnesia in which the alumina content is about 24.8 percent by weight, the magnesia content is about 7.5 percent by weight, and remainder silica.

3. A cogelled catalyst consisting essentially of a major proportion of silica and minor proportions of alumina and magnesia in which the alumina content is about 18.7 percent by weight, the magnesia content is about 14.5 percent by weight, and remainder silica.

References Cited in the file of this patent

UNITED STATES PATENTS

| | | |
|---|---|---|
| 2,551,014 | Kimberlin et al. | May 1, 1951 |
| 2,606,877 | West | Aug. 12, 1952 |
| 2,631,983 | Milliken | Mar. 17, 1953 |
| 2,688,002 | Milliken | Aug. 31, 1954 |
| 2,699,430 | Teter | Jan. 11, 1955 |
| 2,701,793 | Ashley | Feb. 8, 1955 |
| 2,731,355 | Skinner | Jan. 17, 1956 |
| 2,776,900 | Duncan et al. | Jan. 8, 1957 |